(12) United States Patent
Dai et al.

(10) Patent No.: US 9,361,926 B2
(45) Date of Patent: Jun. 7, 2016

(54) MEDIA ETCH PROCESS

(71) Applicant: HGST Netherlands B.V., Amsterdam (NL)

(72) Inventors: Qing Dai, San Jose, CA (US);
Oleksandr Mosendz, San Jose, CA (US); Simone Pisana, San Jose, CA (US); James Reiner, Palo Alto, CA (US); Hans Richter, Palo Alto, CA (US); Franck Rose, San Jose, CA (US); Dieter Weller, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 18 days.

(21) Appl. No.: 13/891,792

(22) Filed: May 10, 2013

(65) Prior Publication Data

US 2014/0332496 A1 Nov. 13, 2014

(51) Int. Cl.
*B44C 1/22* (2006.01)
*G11B 5/82* (2006.01)
*G11B 5/851* (2006.01)
*G11B 5/84* (2006.01)
*G11B 5/65* (2006.01)
*G11B 5/66* (2006.01)

(52) U.S. Cl.
CPC .. *G11B 5/84* (2013.01); *G11B 5/65* (2013.01); *G11B 5/66* (2013.01)

(58) Field of Classification Search
CPC .... G11B 5/851; G11B 5/708; G11B 5/70615; H01L 21/3065; C23C 14/0605; C23C 14/352
USPC ...................... 216/22, 38, 68; 360/135; 438/3
See application file for complete search history.

(56) References Cited

U.S. PATENT DOCUMENTS

| | | | |
|---|---|---|---|
| 6,636,460 B2 | 10/2003 | Akiyama et al. | |
| 6,826,131 B2* | 11/2004 | Kawaguchi et al. | 428/819.2 |
| 7,497,892 B2 | 3/2009 | Hattori | |
| 8,268,462 B2 | 9/2012 | Peng et al. | |
| 8,431,258 B2 | 4/2013 | Onoue et al. | |
| 8,623,670 B1* | 1/2014 | Mosendz et al. | 438/3 |
| 2002/0098382 A1 | 7/2002 | Lee et al. | |
| 2004/0080876 A1* | 4/2004 | Sugita | B82Y 10/00 360/324.2 |
| 2007/0227624 A1* | 10/2007 | Hattori | 148/105 |
| 2010/0247964 A1* | 9/2010 | Onoue et al. | 428/800 |
| 2011/0164336 A1* | 7/2011 | Hirayama et al. | 360/135 |
| 2011/0235479 A1 | 9/2011 | Kanbe et al. | |
| 2012/0189872 A1* | 7/2012 | Umezawa et al. | 428/828.1 |

(Continued)

OTHER PUBLICATIONS

Hirotsune, Akemi et al., "Improved Grain Isolation in [Co/Pd]n Multilayer Media for Thermally Assisted Magnetic Recording", http://umc.edu.dz/vf/images/ieee-magnetique/jpdfs/ieee/mag/tmag/2010046/06jun/1569hiro.pdf, Transactions on Magnetics, vol. 46, No. 6, Jun. 2010.

(Continued)

*Primary Examiner* — Nadine Norton
*Assistant Examiner* — Thomas Pham
(74) *Attorney, Agent, or Firm* — Zilka-Kotab, PC

(57) ABSTRACT

A method for etching a media is disclosed. A first magnetic layer comprising grains is deposited with a segregant such that a portion of the first segregant covers a top surface of the grains of the first magnetic layer and a second portion of the first segregant separates the grains of the first magnetic layer. The first segregant is etched to remove the portion of the first segregant that covers the top surface of the grains.

14 Claims, 9 Drawing Sheets

(56) References Cited

U.S. PATENT DOCUMENTS

| | | | | |
|---|---|---|---|---|
| 2013/0040167 A1* | 2/2013 | Alagarsamy | ............ | G11B 5/653 428/831.2 |
| 2013/0306471 A1* | 11/2013 | Ishiyama | ................. | B22F 3/14 204/298.13 |
| 2014/0153128 A1* | 6/2014 | Teguri | ...................... | G11B 5/65 360/59 |

OTHER PUBLICATIONS

Kim, Eun H. et al., "Etch characteristics of FePt magnetic thin films using inductively coupled plasma reactive ion etching", http://atechsystem.co.kr/product/custom/Etcher/reference8.pdf, Elsevier, Thin Solid Films, Apr. 1, 2011.

Mosendz, O et al., "Ultra-high coercivity small-grain FePt media for thermally assisted recording (invited)", AIP—Journal of Applied Physics, http://jap.aip.org/resource/1/japiau/v111/i7/p07B729_s1?isAuthorized=no, Mar. 14, 2012.

Weller, Dieter , "Thermally Assisted Magnetic Recording at 620 Gb/in2 using Granular L10 FeCuPtAg-X Media", http://www.physics.sfu.ca/events/eventitem?id=594.

Yang, EN et al., "L10 FePt—oxide columnar perpendicular media with high coercivity and small grain size", Jornal of Applied Physics, http://jap.aip.org/resource/1/japiau/v104/i2/p023904_s1?isAuthorized=no, Jul. 21, 2008.

Zhang, Li et al., "L10-ordered high coercivity (FePt)Ag—C granular thin films for perpendicular recording", http://www.nims.go.jp/apfim/pdf/FePtAgC_JMMM_PrePrint.pdf, 2010.

* cited by examiner

700

```
┌─────────────────────────────────────────────────────┐
│ A FIRST MAGNETIC LAYER COMPRISING GRAINS IS         │
│ DEPOSITED WITH A FIRST SEGREGANT SUCH THAT A        │
│ PORTION OF THE FIRST SEGREGANT COVERS A TOP         │
│ SURFACE OF THE GRAINS OF THE FIRST MAGNETIC         │
│ LAYER AND A SECOND PORTION OF THE FIRST             │
│ SEGREGANT SEPARATES THE GRAINS OF THE FIRST         │
│ MAGNETIC LAYER.                                     │
│ 702                                                 │
└─────────────────────────────────────────────────────┘
                          │
                          ▼
┌─────────────────────────────────────────────────────┐
│ THE FIRST SEGREGANT IS ETCHED TO REMOVE THE         │
│ PORTION OF THE FIRST SEGREGANT THAT COVERS          │
│ THE TOP SURFACE OF THE GRAINS.                      │
│ 704                                                 │
└─────────────────────────────────────────────────────┘
                          │
                          ▼
┌─────────────────────────────────────────────────────┐
│ A SECOND MAGNETIC LAYER IS DEPOSITED OVER THE       │
│ FIRST MAGNETIC LAYER AFTER THE ETCHING SUCH         │
│ THAT THE FIRST MAGNETIC LAYER IS MAGNETICALLY       │
│ COUPLE TO THE SECOND MAGNETIC LAYER.                │
│ 706                                                 │
└─────────────────────────────────────────────────────┘
                          │
                          ▼
┌─────────────────────────────────────────────────────┐
│ AN OVERCOAT LAYER IS DEPOSITED OVER EXPOSED         │
│ PORTIONS OF THE GRAINS OF THE FIRST MAGNETIC        │
│ LAYER AFTER THE ETCHING.                            │
│ 708                                                 │
└─────────────────────────────────────────────────────┘
```

```
┌─────────────────────────────────────────────────────────────┐
│ A FIRST MAGNETIC LAYER COMPRISING GRAINS IS DEPOSITED WITH  │
│   A FIRST SEGREGANT SUCH THAT A PORTION OF THE FIRST        │
│ SEGREGANT COVERS A TOP SURFACE OF THE GRAINS OF THE FIRST   │
│    MAGNETIC LAYER AND A SECOND PORTION OF THE FIRST         │
│    SEGREGANT SEPARATES THE GRAINS OF THE FIRST MAGNETIC     │
│                           LAYER.                            │
│                            802                              │
└─────────────────────────────────────────────────────────────┘
                              │
                              ▼
┌─────────────────────────────────────────────────────────────┐
│  THE FIRST SEGREGANT IS ETCHED TO REMOVE THE PORTION OF THE │
│     FIRST SEGREGANT THAT COVERS THE TOP SURFACE OF THE      │
│                           GRAINS.                           │
│                            804                              │
└─────────────────────────────────────────────────────────────┘
                              │
                              ▼
┌─────────────────────────────────────────────────────────────┐
│   AT LEAST ONE ADDITIONAL CONTINUOUS EXCHANGE COUPLING      │
│      LAYER IS DEPOSITED OVER THE FIRST MAGNETIC LAYER.      │
│                            806                              │
└─────────────────────────────────────────────────────────────┘
                              │
                              ▼
┌─────────────────────────────────────────────────────────────┐
│  THE AT LEAST ONE ADDITIONAL CONTINUOUS EXCHANGE COUPLING   │
│                      LAYER IS ETCHED.                       │
│                            808                              │
└─────────────────────────────────────────────────────────────┘
```

Fig. 8

MEDIA ETCH PROCESS

BACKGROUND ART

A hard disk drive (HDD) may be used by a computer system for operations. In fact, most computing systems are not operational without some type of data storage such as a HDD to store the most basic computing information such as the boot operation, the operating system, the applications, and the like. In general, the HDD is a component for use in a computer system or may be used as a component of dedicated remote data storage systems for use in cloud computing. A HDD often uses a media or substrate such as a hard disk. The hard disk may be comprised of different layers and may be manufactured using various techniques.

BRIEF DESCRIPTION OF THE DRAWINGS

FIG. 7 is a flow chart of a method for etching a media in accordance with embodiments of the present invention.

FIG. 8 is a flow chart of a method for etching a media in accordance with embodiments of the present invention.

DESCRIPTION OF EMBODIMENTS

Figure 1:
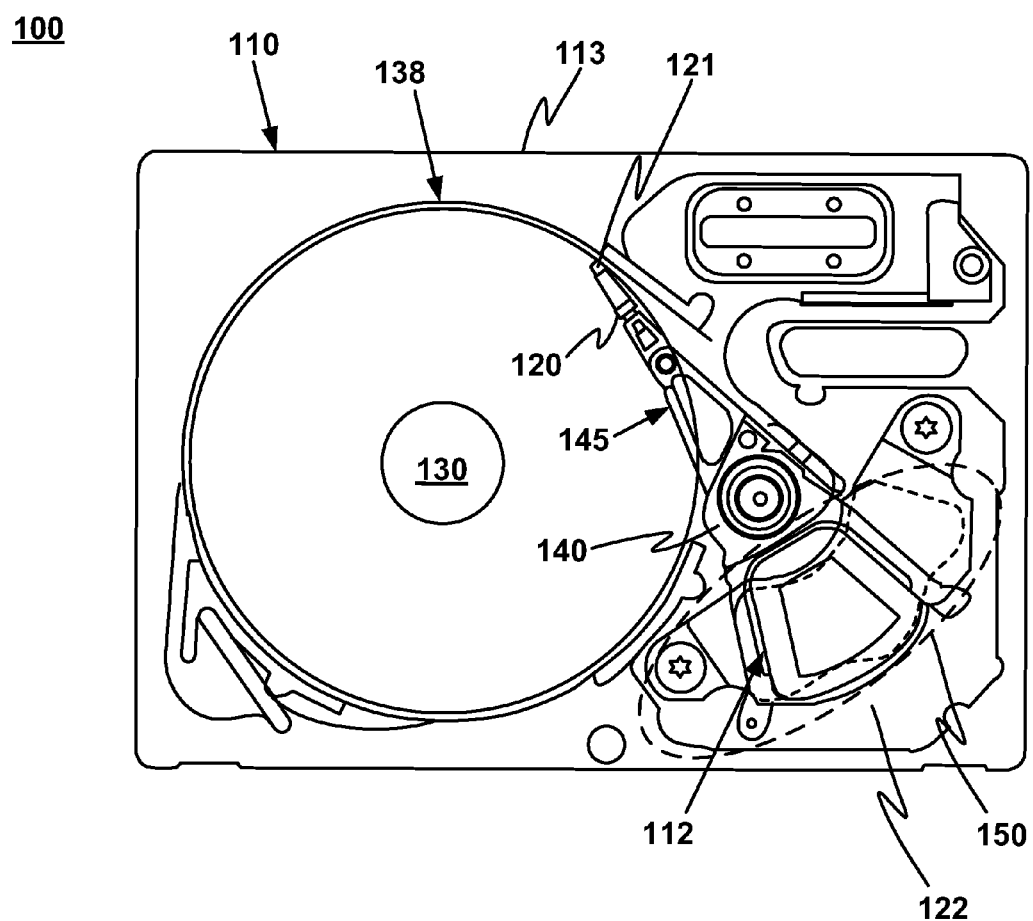
FIG. 1 is a schematic diagram of an HDD in accordance with embodiments of the present invention.

Reference will now be made in detail to various embodiments of the present invention. While the invention will be described in conjunction with these embodiments, it should be understood that the described embodiments are not intended to limit the invention to these embodiments. On the contrary, the invention is intended to cover alternatives, modifications and equivalents, which may be included within the spirit and scope of the invention as described in the various embodiments and as defined by the appended claims.

Furthermore, in the following description of embodiments, numerous specific details are set forth in order to provide a thorough understanding of various embodiments of the present invention. However, it will be recognized by one of ordinary skill in the art that embodiments of the present invention may be practiced without these specific details. In other instances, well known methods, procedures, components, and circuits have not been described in detail as not to unnecessarily obscure aspects of embodiments of the present invention.

Overview of Discussion

The discussion will begin with a brief overview of the present invention. The discussion will then focus on a hard disk drive (HDD) and components connected therewith. The discussion will then focus on embodiments of media etch processes and the resulting media. In particular, the present technology is for a media etch process for roughness reduction and may also be for introducing additional magnetically coupled layers in the media. In one embodiment, the media is iron platinum (FePt) based and the media is used for Heat Assisted Magnetic Recording (HAMR) in HDDs.

In one embodiment, the media is employed by a HDD to read and write data. The media may have a first magnetic layer that comprises of grains. The size and shape of the grains affects the ability and efficiency of the HDD in reading and writing data to and from the media. The present technology deposits the first magnetic layer with a segregant such that the segregant separates and covers, separates, and isolates the grains. The segregant may also control the size, shape, and distributions of the grains in the first magnetic layer. However, the deposition of the segregant with the first magnetic layer may result in some roughness of the media. To reduce this roughness the first magnetic layer and the segregant are etched. In one embodiment, an inductive coupling plasma (ICP) etch is employed. As a result the etching planarizes the media and reduce the media roughness.

In one embodiment, an additional magnetic layer is deposited over the etched surface of first magnetic layer. The additional magnetic layer may or may not comprise a segregant and may or may not be etched. These two layers may be coupled magnetically. In one embodiment, an overcoat layer is deposited over the first magnetic layer or the additional magnetic layer. In one embodiment, the media comprises multiple layers such as an overcoat layer over an additional magnetic layer over an etched first magnetic layer with a segregant over a texturing layer over a plurality of under layers over a high temperature glass substrate.

Operation

The basic HDD model includes a magnetic storage disk, hard disk, or media that spins at a designed rotational speed. Layers of the media may comprise a segregant and may be etched using the present technology. An actuator arm with a suspended slider is utilized to reach out over the disk. The slider may comprise one or more magnetic read and write transducers or heads for reading and writing information to or from a location on the disk. The slider may also comprise a heater coil designed to change shape when heat is transferred to the heater coil by means of electric current. The slider is mounted on a suspension which connects to the actuator arm. In the case of multiple platter drives, there can be multiple suspensions attaching to multiple actuator arms as components of a head stack assembly. The head stack assembly also includes a voice coil which is part of a motor used for moving the arms to a desired location on the disk(s).

With reference now to FIG. 1, a schematic drawing of one embodiment of an information storage system including a magnetic hard disk file or HDD 110 for a computer system is shown, although only one head and one disk surface combination are shown. What is described herein for one head-disk combination is also applicable to multiple head-disk combinations. In other words, embodiments of the present technology are independent of the number of head-disk combinations. FIG. 1 represents an information storage device that is in accordance with embodiments of the present technology for media etch processes.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 140 includes one or more actuator arms 145. When a number of actuator arms 145 are present, they are usually represented in the form of a comb that is movably or pivotally mounted to base/housing 113. An actuator arm controller 150 is also mounted to base 113 for selectively moving the actuator arms 145 relative to the disk 138. Actuator assembly 140 may be coupled with a connector assembly, such as a flex cable to convey data between arm electronics and a host system, such as a computer, wherein HDD 110 resides.

In one embodiment, each actuator arm 145 has extending from it at least one cantilevered integrated lead suspension (ILS) 120. The ILS 120 may be any form of lead suspension that can be used in a data access storage device. The level of integration containing the slider 121, ILS 120, and read and write head is called the head stack assembly.

The ILS 120 has a spring-like quality, which biases or presses the air-bearing surface of slider 121 against disk 138 to cause slider 121 to fly at a precise distance from disk 138. Slider 121 may have a pole tip which protrudes at various lengths from slider 121. Slider 121 may also contain a read head, a write head and a heater coil. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 145 opposite the head stack assemblies. Movement of the actuator assembly 140 causes the head stack assembly to move along radial arcs across tracks on the surface of disk 138. In one embodiment, actuator arm controller 150 controls a plurality of actuator arms associated with a plurality of disks.

Figure 2:
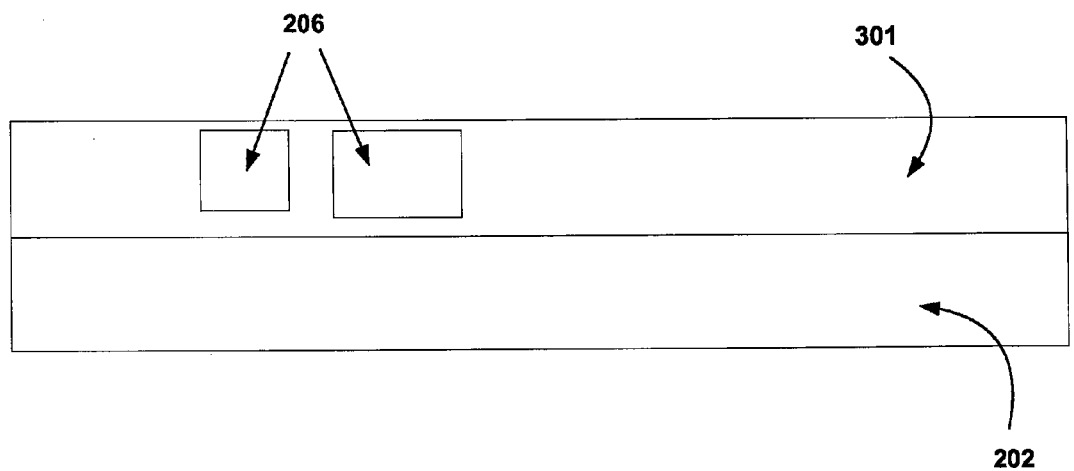
FIG. 2 is a schematic diagram of a magnetic layer over a texturing layer in accordance with embodiments of the present invention.

Reference will now be made to FIG. 2, a schematic diagram of a cross section of a first magnetic layer over a texturing layer in accordance with embodiments of the present invention. FIG. 2 comprises texturing layer 202, first magnetic layer 301, and grains 206. It should be appreciated that texturing layer 202 may also be described as a texture defining layer and may be composed of magnesium oxide MgO, MnO, Cr, Cr alloys, ruthenium aluminum RuAl, titanium nitride TiN, titanium carbide TiC, or other appropriate material.

In one embodiment, FIG. 2 depicts first magnetic layer 301 deposited over texturing layer 202 without a segregant. Grains 206 are depicted in FIG. 2 as being different sizes because they lack a segregant to refine grain size and provide magnetic isolation between the grains. The grains of first magnetic layer 301 may or may not be the same size and shape. It should be appreciated that first magnetic layer 301 may have a plurality of grains and that the grains are used for read and write operations in a HDD by reversing magnetic fields.

Figure 3A:
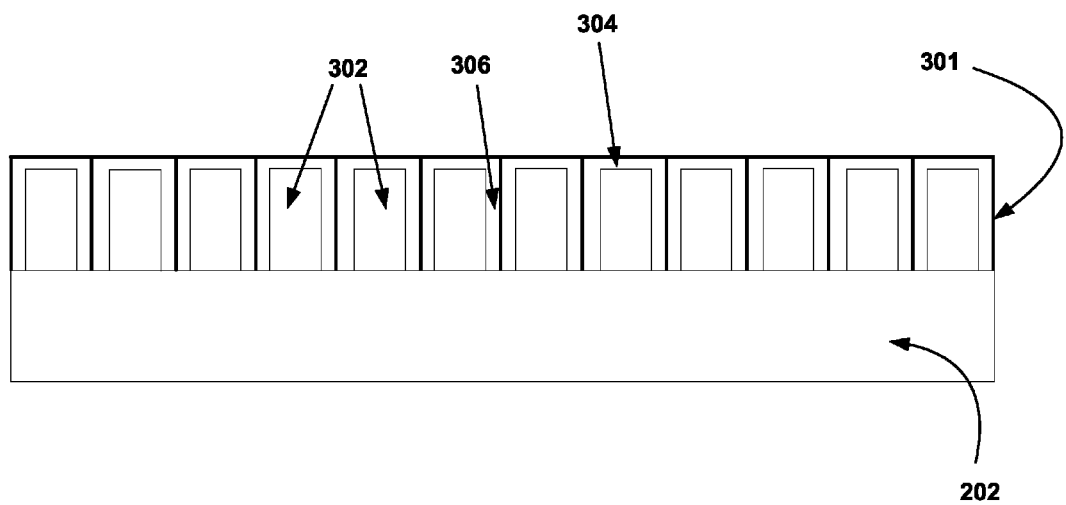
FIG. 3A is a schematic diagram of a magnetic layer with a segregant over a texturing layer in accordance with embodiments of the present invention.

Reference will now be made to FIG. 3A, a schematic diagram of a cross section of a first magnetic layer with a segregant over a texturing layer in accordance with embodiments of the present invention. FIG. 3A depicts first magnetic layer 301 after a first magnetic layer is deposited. The segregant is deposited together with magnetic material which form grains 302 such that they control the grain size and provide lateral magnetic isolation. A portion of the segregant may cover a top portion of the grain as is depicted by first portion 304. For example, top portion 304 may be formed by some part of the segregant which flows to the top of first magnetic layer 301 due to a high temperature. A portion of the segregant may separate a grain from another grain as is depicted by second portion 306. The segregation of grains occurs automatically during the deposition of the magnetic material and segregant which occur simultaneously to form first magnetic layer 301. First magnetic layer 301 may be a described as a metal-segregant layer or a composite FePt-segregant layer.

First magnetic layer 301 is composed of metallic magnetic material and segregant. A magnetic material that forms grains such as grains 302, and segregant material occupies space in between metallic grains. In one embodiment, first magnetic layer 301 is composed of iron platinum that is alloyed with a second material or species such as silver Ag, copper Cu, gold Au, manganese, and nickel Ni. The present technology may employ Heat Assisted Magnetic Recording (HAMR) or temperature assisted magnetic recording (TAR) to write data to a media. However, HAMR may require control of the grain size of first magnetic layer 301 to ensure that the grains are sufficient small in size. For example, a grain size of 12 nanometers (nm) may be too large to ensure recording density at the required level. In order to obtain small granular media, the present technology employs a segregant to refine grain size and provide magnetic isolation between the grains.

The deposition of a metal-segregant layer may form an FePt $L1_0$ based media for use with HAMR. In order to obtain the desired $L1_0$ ordering of FePt, the deposition temperature has to be increased in order to promote diffusion and allow FePt atoms to occupy the correct sites in the $L1_0$ structure. In one embodiment, the segregant is composed of carbon C. After the deposition of the segregant, the media may be referred to as an FePt—X—C media where X represents a material alloyed with the FePt and C represent carbon for the segregant. The media may also be referred to as an FePt—X—Y media where X represents a material alloyed with the FePt and Y represent carbon combined with one of several other species for the segregant. It should be appreciated that the segregant may be composed of carbon combined with silicon dioxide $SiO_2$, titanium dioxide $TiO_2$, tantalum oxide $TaO_x$, silicon mononitride SiN, silicon carbide SiC, titanium carbide TiC, titanium nitride TiN, boron nitride BN, boron carbon BC, chromium oxide, iron oxide, and iron nitride. In one embodiment, segregant material may include additional dopants, such as Ag, Mn, Fe, Cr used to control magnetic and structural properties of the FePt L10 based media.

In one embodiment, FePt $L1_0$ phase based thin films exhibit strong perpendicular anisotropy, which potentially leads to small thermally stable grains, such as 3-10 nm in diameter, for ultra high density magnetic recording. In one embodiment, in order to fabricate small grain FePt $L1_0$ media, some form of segregant, material to separate grains, needs to be used as an integral part of the magnetic thin film.

In one embodiment, in order to control grain size, different amounts of segregants are used. For small grain size, 3-9 nm in diameter grains, up to 60% by volume of the whole film is occupied by segregants outlined above or their mixtures. Segregants can be introduced throughout film deposition at a constant composition, or they can be introduced sequentially, i.e. start with one segregant or mixture and switch to the other segregant or mixture at a later stage of deposition. In one embodiment, the segregant content may vary in terms of material and composition throughout film deposition. In one embodiment, C as a single segregant of up to 60% percent or its mixture with other materials shows excellent grain segregation which assures good magnetic properties of the thin FePt $L1_0$ based film.

In one embodiment, FePt films are grown by magnetron sputtering co-deposition, in Ar gas at 3-20 mTorr, from a C target, Ag target, and an FePt alloy target having the composition Fe 55% and Pt 45%. However, the present technology could be implemented with a variety of FePt alloys with different compositions including, but limited to, ranging from 35-65% Fe, or with an FePt—X—Y alloy target with different composition ranging from 40-60% Fe, with X and Y described above. The seed layers used for such films are NiTa/Cr/MgO, NiTa/MgO, although different materials such as Pt, TiN, or TiC, RuAl could be also used.

It should be appreciated that segregant material such as C allows for small grains, however C graphitizes when deposited at high temperature and encapsulates the FePt grains forming so-called C onions. As a result of very low energy graphitic C surrounding the grain, FePt tends to self-organize in spherical structures covering the FePt based metallic grains. Spherical grain shape and C onions result in increased film roughness and magnetic isolation of the FePt grains from any magnetic material that can be deposited subsequently. In other words, fabrication of media which is more complex than a single layer film may be difficult when the FePt grains are encapsulated in the segregant material. Fullerene-like C onions surrounding FePt grains in as deposited media, which may prevent magnetic coupling of first magnetic layer 301 to subsequent magnetic layers.

In one embodiment, the thickness of the FePt grains are between 4 and 15 nm, the diameter of the FePt grains are between 3 and 10 nm, and pitch between the segregated grain between 3 and 11 nm.

Figure 3B:
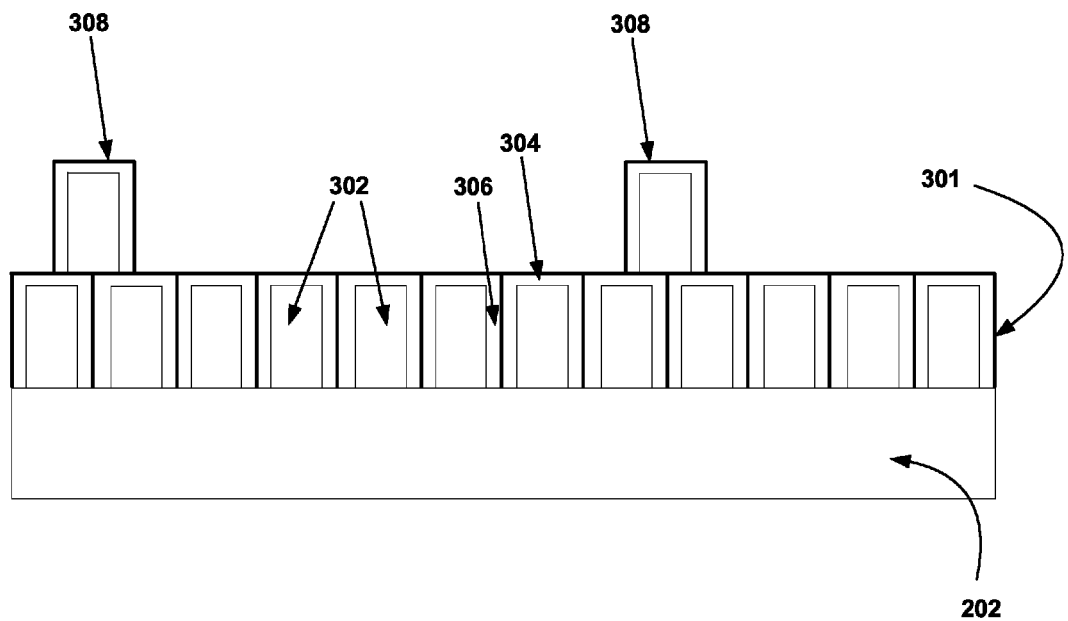
FIG. 3B is a schematic diagram of a magnetic layer with a segregant over a texturing layer in accordance with embodiments of the present invention.

Reference will now be made to FIG. 3B, a schematic diagram of a cross section of a first magnetic layer with a segregant over a texturing layer in accordance with embodiments of the present invention. FIG. 3A depicts first magnetic layer 301. In one embodiment, after the magnetic layer deposition with the segregant, a second layer of grains is formed over the media. The second layer may not have correct crystal orientation, may not be uniform in distribution but may be protruding from the first magnetic layer 301, thus increasing film roughness. Second layer of grains 308 depict two examples of grains protruding from first magnetic layer 301. If the second layer of grains is present it may contribute to media roughness. The deposition of the magnetic material with the segregant may or may not lead to a second layer of grains protruding from the surface of first magnetic layer 301.

Figure 4:
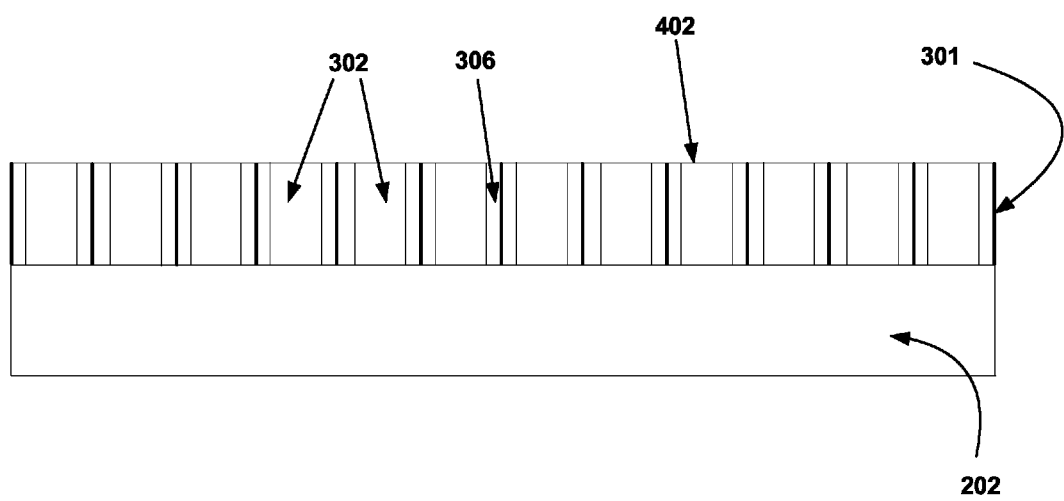
FIG. 4 is a schematic diagram of a magnetic layer with a segregant over a texturing layer in accordance with embodiments of the present invention.

Reference will now be made to FIG. 4, a schematic diagram of a cross section of a first magnetic layer with a segregant over a texturing layer in accordance with embodiments of the present invention. FIG. 4 depicts first magnetic layer 301 after a deposition of a magnetic material with a segregant and after an etching. In one embodiment, the surface of first magnetic layer 301 is etched to remove portions of the segregant that are covering the top surface of the grains of first magnetic layer 301 to form surface 402. The top surface of the grain is defined to be the surface of the grain that is parallel to and facing away from the surface that is contact with texturing layer 202. In one embodiment, the etching leaves a portion of the segregant in between the grains such as second portion 306. The etch may be described as a partial etch as a portion of the segregant remains. In one embodiment, the etching removes the second layer of grains encapsulated with the segregant protruding from the surface of first magnetic layer 301. The etching may expose the top surface of grains 302 to allow for magnetic coupling of first magnetic layer 301 to a subsequent layer. The etching also results in planarization of first magnetic layer 301 and a reduced media roughness. For example, before the etch the media roughness may be between 8-11 nm, but is reduced to less than 6 nm for after etching.

In one embodiment, the etching is accomplished via an inductive coupling plasma (ICP) etch. It should be appreciated that the etch may be, but is not limited to a physical etch, a chemical, or a combination of the two. The physical etch may be etching with high energy impinging ions, for example argon Ar. The chemical etching may use reactive ions, for example ions of H2 gas.

Figure 5:
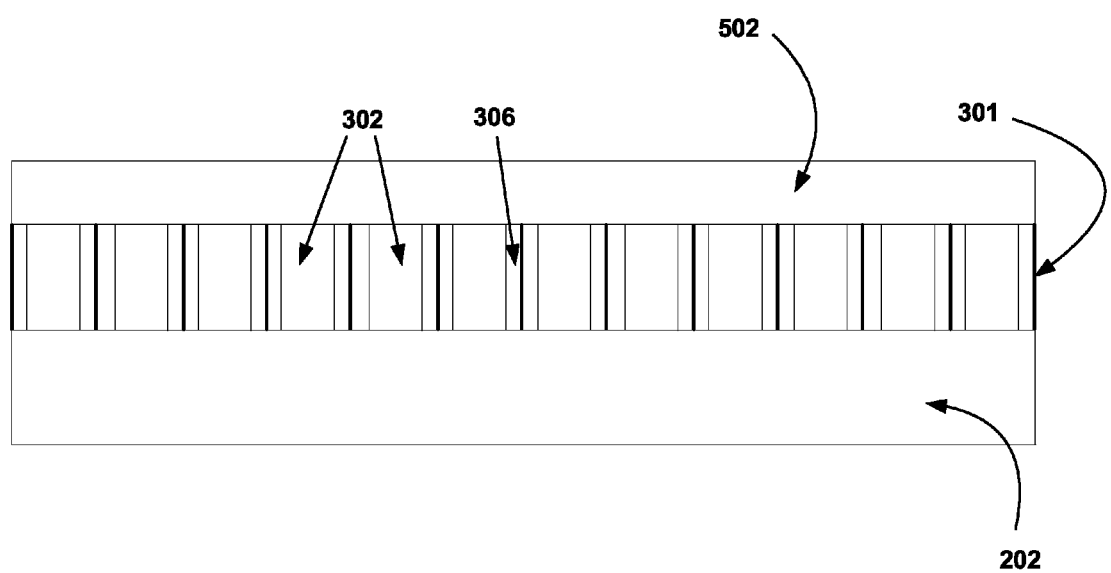
FIG. 5 is a schematic diagram of an overcoat layer over a magnetic layer with a segregant over a texturing layer in accordance with embodiments of the present invention.

Reference will now be made to FIG. 5, a schematic diagram of a cross section of an overcoat over a first magnetic layer with a segregant over a texturing layer in accordance with embodiments of the present invention. FIG. 5 depicts first magnetic layer 301 after a segregant deposition and after an etching and after the deposition of overcoat 502. In one embodiment, overcoat 502 is deposited over the exposed surface of the grains of first magnetic layer 301 after it has been etched. As depicted, second portion 306 of the segregant remains between grains 302. In one embodiment, overcoat 502 is in contact with the surface of first magnetic layer 301. In one embodiment, overcoat 502 is deposited such that it is over a second magnetic layer, but it is not in contact with first magnetic layer 301 because of an intervening layer as is depicted in FIG. 6.

Figure 6:
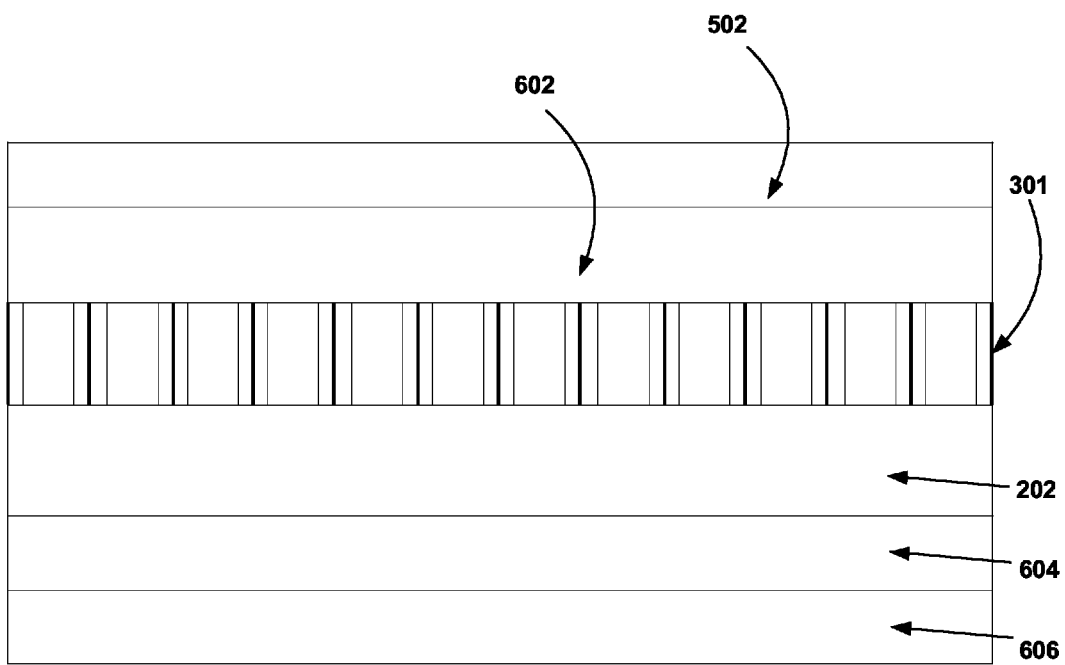
FIG. 6 is a schematic diagram of an overcoat layer over an additional magnetic layer over a magnetic layer with a segregant over a texturing layer over an under layer over a glass layer in accordance with embodiments of the present invention.

Reference will now be made to FIG. 6, a schematic diagram of a cross section of an overcoat over an additional magnetic layer over a first magnetic layer with a segregant over a texturing layer over under layers over a glass substrate in accordance with embodiments of the present invention. FIG. 6 depicts additional magnetic layer 602 over first magnetic layer 301 after a deposition with a segregant and after an etching. In one embodiment, a surface of additional magnetic layer 602 is in contact with first magnetic layer 301 and the two layers are magnetically coupled to one another. Additional magnetic layer 602 may be amorphous or crystalline and may be composed of materials similar to or different from the materials of first magnetic layer 301. In one embodiment, a segregant may be added to additional magnetic layer 602 during the deposition of additional magnetic layer 602. The segregant may be similar to or different from the segregant used for first magnetic layer 301. This may be described as a second segregant deposition. Subsequently, additional magnetic layer 602 with the second segregant may be etched using techniques described for first magnetic layer 301. In one embodiment, a plurality of subsequent magnetic layers are deposited each magnetic layer deposited over the previous layer. Each layer may have a segregant deposited with the layer and accompanying etching before the deposition of the next magnetic layer. In one embodiment, at least one additional continuous exchange layer is used as intermediate step before overcoat 502 is deposited.

Magnetic properties and recording quality of the media can be modified and improved by introduction of additional functional magnetic layers. For these additional layers to have effect on the recording layer, magnetic exchange coupling is needed between the FePt grains and the additional magnetic layers. In one embodiment, the thickness of additional magnetic layer 602 and other subsequent magnetic layer are between 0.5-5 nm.

In one embodiment, first magnetic layer 301 has a Curie temperature. Additional magnetic layer 602 may have a Curie temperature that is higher or lower than the Curie temperature of first magnetic layer 301. In one embodiment, additional magnetic layer 602 is composed of a combination of materials where a first material has a Curie temperature higher than the Curie temperature of first magnetic layer 301 and a second material that is lower than the Curie temperature of first magnetic layer 301. Thus the additional magnetic layer 602 may have Curie temperatures that are both lower and higher than the Curie temperature of first magnetic layer 301.

In one embodiment, overcoat 502 is deposited over first magnetic layer 301 and additional magnetic layer 602 such that overcoat 502 is in contact with a surface of additional magnetic layer 602. FIG. 6 depicts texturing layer 202 over under layers 604 which may be a plurality of under layers. Under layers 604 are depicted as being deposited over glass substrate 606 which may be high temperature glass. In one embodiment, the disk for the HDD comprises overcoat 502 first magnetic layer 301, texturing layer 202, under layers 604, and glass substrate 606 and may or may not include additional magnetic layer 602.

FIG. 7 is a flowchart illustrating process 700 for etching a media, in accordance with one embodiment of the present technology. Process 700 and it steps are depicted in FIGS. 2, 3A, 3B, 4, 5, and 6. The media etched by process 700 may be a media such as a disk in a HDD such as the HDD depicted in FIG. 1.

At 702, a first magnetic layer is deposited together with a first segregant. The first magnetic layer comprises grains. For example, this may be first magnetic layer 301 deposited over texturing layer 202 of FIG. 2. The first magnetic layer may be FePt or an FePt alloy.

The first segregant is deposited together with the first magnetic layer by co-sputtering or from a composite target such that a portion of the first segregant covers a top surface of the grains of the first magnetic layer and a second portion of the first segregant separates the grains of the first magnetic layer. For example, the segregant may be the segregant depicted in FIG. 3A with first portion 304 and second portion 306. The segregant may be composed of carbon and may comprise a second material. The first segregant is also used to control the grains size of the first magnetic layer. In one embodiment, the first segregant makes the grain size smaller. In one embodiment, the first segregant encapsulates each grain of the first magnetic layer.

At 704, the first segregant is etched to remove the portion of the first segregant that covers the top surface of the grains. For example, surface 402 of FIG. 4 is exposed. The etch may be an inductive coupling plasma (ICP) etch. The etch results in a planarization and roughness reduction of surface 402 and allows surface 402 to magnetically couple to another surface.

In one embodiment, the first segregant creates a second layer of grains over a first layer of grains of the first magnetic layer. The second layer of grains may be encapsulated by the first segregant and protrude from the first layer of grains away from the texturing layer. The second layer of grains may be etched by step 706.

At 706, a second magnetic layer is deposited over the first magnetic layer after the etching such that the first magnetic layer is magnetically coupled to the second magnetic layer. The second magnetic layer may be described as additional magnetic layer 602 of FIG. 6. Various embodiments may or may not include a second magnetic layer or may include a plurality of additional magnetic layers. The second magnetic layer may have a second segregant and may be etched similar to the first magnetic layer.

At 708, an overcoat layer is deposited over exposed portions of the grains of the first magnetic layer after the etching. The overcoat layer may be overcoat 502 of FIGS. 5 and 6. In one embodiment, the overcoat layer is in contact with the first magnetic layer if there is no second magnetic layer as in step 708. In one embodiment, the overcoat layer is in contact with the second magnetic layer or a subsequent magnetic layer.

FIG. 8 is a flowchart illustrating process 800 for etching a media, in accordance with one embodiment of the present technology. Process 800 and it steps are depicted in FIGS. 2, 3A, 3B, 4, 5, and 6. The media etched by process 800 may be a media such as a disk in a HDD such as the HDD depicted in FIG. 1.

At 802, a first magnetic layer comprising grains is deposited together with a first segregant. For example, this may be first magnetic layer 301 deposited over texturing layer 202 of FIG. 2. The first magnetic layer may be FePt or an FePt alloy.

The first segregant is deposited together with the first magnetic layer by co-suttering or from a composite target such that a portion of the first segregant covers a top surface of the grains of the first magnetic layer and a second portion of the first segregant separates the grains of the first magnetic layer. For example, the segregant may be the segregant depicted in FIG. 3A with first portion 304 and second portion 306. The segregant may be composed of carbon and may comprise a second material. The first segregant is also used to control the grains size of the first magnetic layer. In one embodiment, the first segregant makes to grain size smaller. In one embodiment, the first segregant encapsulates each grain of the first magnetic layer.

At 804, the first segregant is etched to remove the portion of the first segregant that covers the top surface of the grains. For example, surface 402 of FIG. 4 is exposed. The etch may be an inductively coupled plasma (ICP) etch. The etch results in a planarization and roughness reduction of surface 402 and allows surface 402 to magnetically couple to another surface.

In one embodiment, the first segregant creates a second layer of grains over a first layer of grains of the first magnetic layer. The second layer of grains may be encapsulated by the first segregant and protrude from the first layer of grains away from the texturing layer. The second layer of grains may be etched by step 706.

At 806, at least one additional continuous exchange coupling layer is deposited over the first magnetic layer. In one embodiment, the at least one additional continuous exchange coupling layer is magnetically coupled to the first magnetic layer after it has been etched. The additional continuous exchange coupling layer may comprise a magnetic material and a segregant material.

At 808, the at least one additional continuous exchange coupling layer is etched. A plurality of continuous exchange layers may be deposited and etched in turn such that each subsequent layer is magnetically coupled to the layer preceding it.

It should be appreciated that the Curie temperature of the at least one additional continuous exchange coupling layer may be lower than or higher than the Curie temperature of the first magnetic layer. Or the at least one additional continuous exchange coupling layer may be composed of a combination of materials that have Curie temperatures both higher and lower than a Curie temperature of the first magnetic layer.

In one embodiment, an overcoat layer is deposited over the composed of a combination of materials that have Curie temperatures both higher and lower than a Curie temperature of the first magnetic layer.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims. Additionally, in various embodiments of the present technology, the steps and methods described herein do not need to be carried out in the order specified, nor do all steps need to be carried out to accomplish the purposes of the technology.

What is claimed:

1. A method for etching a media, said method comprising:
depositing a first magnetic layer comprising grains and a first segregant such that a portion of said first segregant covers a top surface of said grains of said first magnetic layer and a second portion of said first segregant separates said grains of said first magnetic layer wherein said depositing said first segregant encapsulates each grain of said grains of said first magnetic layer with said first segregant and wherein said first segregant controls a size of said grains and provides lateral magnetic isolation;
etching said first segregant to remove said portion of said first segregant that covers said top surface of said grains; and
depositing a second magnetic layer over said first magnetic layer after said etching such that said first magnetic layer is magnetically coupled to said second magnetic layer.

2. The method as recited in claim 1, further comprising:
depositing an overcoat layer over exposed portions of said grains of said first magnetic layer after said etching.

3. The method as recited in claim 1 wherein said depositing said first magnetic layer is deposited over a texturing layer, said texturing layer is over a plurality of under layers, and said plurality of under layers are over high temperature glass.

4. The method as recited in claim 1, further comprising:
wherein said depositing said first segregant creates a second layer of grains over said grains of said first magnetic layer, wherein said second layer of said grains are encapsulated by said first segregant; and
wherein said etching removes said second layer of said grains.

5. The method as recited in claim 1 wherein said depositing said first segregant reduces a size of said grains of said first magnetic layer.

6. The method as recited in claim 1 wherein said etching results in a planarization of a top surface of said first magnetic layer.

7. The method as recited in claim 1 wherein said etch is an inductively coupled plasma (ICP) etch.

8. The method as recited in claim 1 wherein said first magnetic layer comprises iron platinum.

9. The method as recited in claim 1 wherein said first magnetic layer comprises an iron platinum alloy wherein said iron platinum alloy further comprises a material selected from the group of materials consisting of: silver, copper, gold, manganese, and nickel.

10. The method as recited in claim 1 wherein said segregant comprises carbon.

11. A method for etching a media, said method comprising:
depositing a first magnetic layer comprising grains with a first segregant over said first magnetic layer such that a portion of said first segregant covers a top surface of said grains of said first magnetic layer and a second portion of said first segregant separates said grains of said first magnetic layer;
etching said first segregant to remove said portion of said first segregant that covers said top surface of said grains;
depositing at least one additional continuous exchange coupling layer over said first magnetic layer; and
etching said at least one additional continuous exchange coupling layer.

12. The method as recited in claim 11 further comprising:
depositing a plurality of additional continuous exchange coupling layers; and
etching each of said plurality of additional continuous exchange coupling layers after each of said depositing.

13. The method as recited in claim 11 wherein said at least one additional continuous exchange coupling layer has a Curie temperature lower than a Curie temperature of said first magnetic layer.

14. The method as recited in claim 11 further comprising:
depositing an overcoat layer over said at least one additional continuous exchange coupling layer after said etching.

* * * * *